Nov. 5, 1929.　　　　P. A. GARRUP　　　　1,734,461
LOCK NUT
Filed May 26, 1928
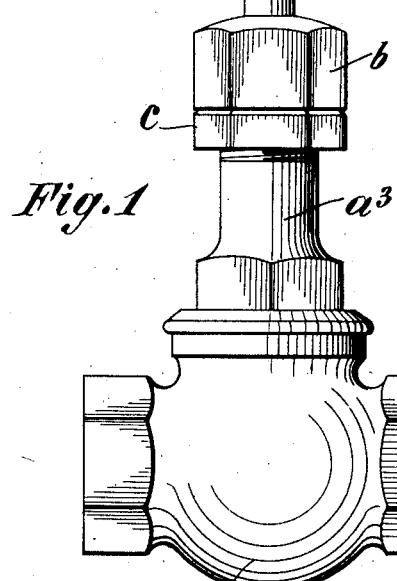
Fig.1
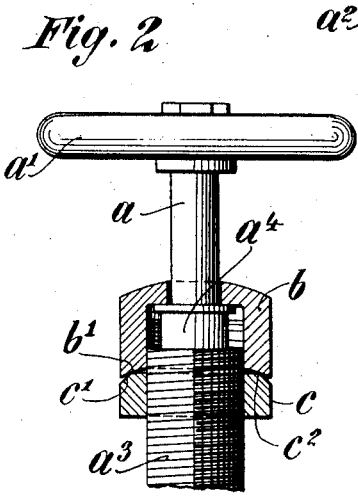
Fig.2
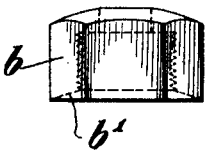
Fig.5
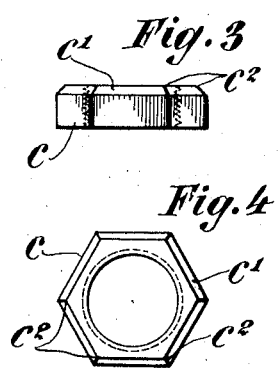
Fig.6
Fig.3
Fig.4
Inventor
Paul A. Garrup,
By his Attorneys
Redding, Greeley, O'Shea & Campbell Patented Nov. 5, 1929

1,734,461

UNITED STATES PATENT OFFICE

PAUL A. GARRUP, OF ISLIP, NEW YORK

LOCK NUT

Application filed May 26, 1928. Serial No. 280,686.

The present invention relates to an improved form of lock nut constructed to prevent, effectively, the nut from working loose upon its threads. Although adaptable to many uses, the lock nut embodying the present invention will be shown herein as applied to a valve to prevent the packing nut from being loosened as a result of the frequent movements of the valve stem.

Where a packing nut is used in connection with a movable element, the difficulty of keeping the packing tight becomes quite an important factor in the maintenance of the valve. Certain forms of packing, when heated, become sticky and work through the packing gland to cause the packing nut to adhere to the valve stem. Under these conditions, the movement of the valve stem exerts a considerable rotative force upon the packing nut and tends to cause the latter to become loose.

An object of this invention is to provide a lock nut which positively prevents movement of the packing nut when the two have been set, the invention embodying an improved form of lock nut having a chamfered face for engaging a cooperating concave face of the packing nut. The corners of the lock nut are caused to engage the soft metal of the packing nut and thus positively prevent its removal.

The invention will be understood more fully in connection with the accompanying drawings, wherein:

Figure 1 is a view in side elevation, showing a valve provided with a lock nut constructed in accordance with the present invention.

Figure 2 is a detail view, partly in section, showing the manner in which the lock nut engages the packing nut.

Figure 3 is a vew in side elevation, showing the lock nut.

Figure 4 is a plan view of the lock nut.

Figure 5 is a side elevation of the packing nut, the concave under surface being shown in dotted lines.

Figure 6 is a bottom view showing the lock nut of Figure 5.

Referring to the above drawings, reference character $a$ designates a valve stem provided with a hand wheel $a'$ and the valve body $a^2$. Threaded upon the valve stem guide $a^3$ is a packing nut $b$ which engages packing gland $a^4$ to maintain the packing tight. The under face $b'$ of the packing nut $b$ is formed with a concave surface as clearly shown in Figures 2 and 5.

Threaded below the packing nut $b$ is a lock nut $c$ having a chamfered upper edge $c'$. The corners $c^2$ formed by the chamfering engage the concave surface $b'$ of the packing nut $b$ as clearly shown in Figure 2 and cut the surface as the lock nut is tightened.

It will be seen that the lock nut engages the packing nut positively and can only be removed by the application of considerable force to rotate it away from the packing nut. Accidental release of the packing nut cannot possibly occur regardless of the condition within the packing nut and the state of the packing. As an additional feature provided by this construction, inspection of the binding edge of the lock nut is rendered possible as it is being tightened. In this manner, any defect in the tapping of the threads on the various elements may be readily detected.

It will be apparent that the packing nut construction can be used in many different installations and its specific form can be varied to suit the requirements of the various installations without departing from the scope of the appended claims.

I claim as my invention:

1. A nut-locking device comprising two nuts adapted to be applied to the same threaded element, one having a concave circular portion on its face adjacent the other nut, and the other having at least three sides the upper edges of which are beveled forming corners adapted to seat against the concave portion of the first nut to lock the same.

2. In combination with a threaded element, a nut thereon having a concave circular portion formed therein, and a second nut on the threaded element having more than two sides each having its upper edges beveled to form sharp corners adapted to seat in the concave portion of the first nut to lock the same when the corners and concave portion are in abutment.

This specification signed this 17th day of May, A. D. 1928.

PAUL A. GARRUP.